Oct. 8, 1929.  H. J. HANZLIK  1,730,503
BEARING

Filed Oct. 18, 1927

INVENTOR
H.J.Hanzlik
BY
ATTORNEY

Patented Oct. 8, 1929

1,730,503

UNITED STATES PATENT OFFICE

HENRY J. HANZLIK, OF SWARTHMORE, PENNSYLVANIA, ASSIGNOR TO WESTINGHOUSE ELECTRIC & MANUFACTURING COMPANY, A CORPORATION OF PENNSYLVANIA

BEARING

Application filed October 18, 1927. Serial No. 226,980.

My invention relates to bearings of the Kingsbury type, and more particularly to thrust bearings, and it has for an object to improve the efficiency of apparatus of this class.

In the operation of apparatus of the type described, the bearing shoes are tiltably mounted and form wedge-shaped oil films which support the rotating body. In order that the oil films may be properly formed, it is desirable that the bearing shoes present plane surfaces.

However, it has been found that under certain conditions, particularly with relatively high pressures, that a certain amount of flexing or bending of the bearing shoes takes place, with the result that, instead of a plane surface, a somewhat convex surface is presented by the bearing metal. Under these conditions the wedge-shaped oil films are no longer well defined. Furthermore, once a convex surface is presented, the bearing metal is worn rapidly away. Moreover, no convenient way has been found, so far as I am aware, in which to prevent bending of bearing shoes of this type, particularly where excessive pressures are encountered.

More particularly, therefore, an object of my invention is to provide a bearing shoe, for bearings of the type described, in which provision shall be made for permitting bending, or flexing of the shoe, while at the same time maintaining a substantially plane surface of bearing metal for forming a well defined oil film.

Apparatus embodying the features of my invention is shown in the accompanying drawings, in which.

It has been found that when a lining of bearing metal is provided, which is so constructed as to present portions of relatively different thickness for sustaining a load, that the thicker portion of the bearing metal is compressed and that there is a tendency for the thinner portion to sustain the greater part of the load. In carrying out my invention I take advantage of this peculiar characteristic of bearing metals.

Figure 4:
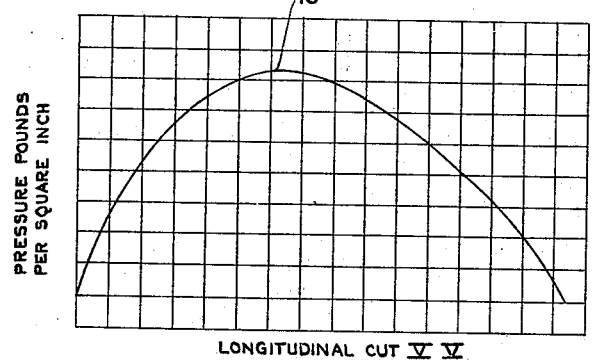
Fig. 4 is a graph of the pressure across the face of a bearing shoe, such as that shown in Fig. 1.

The pressure across the face of the pivotally mounted, bearing shoes, of a bearing of the Kingsbury type, is substantially as shown by the graph in Fig. 4, in which it will be noted that the maximum pressure at 18, is almost directly over the pivotal mounting, from whence the pressure drops, in all directions, according to the graph.

Figure 1:
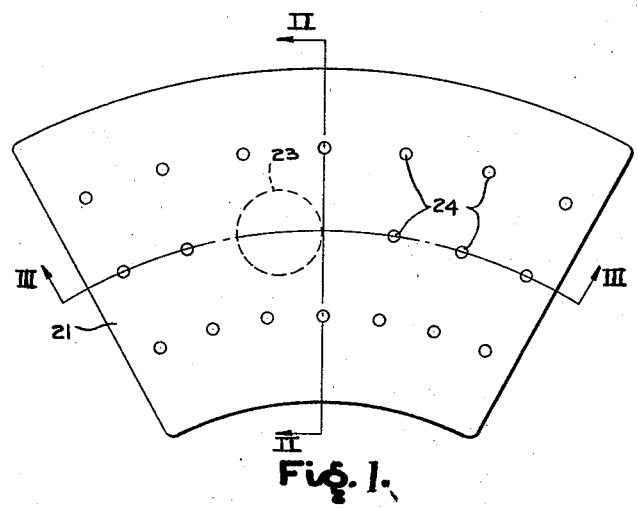
Fig. 1 is a face view of a segmental bearing shoe.
Figure 2:
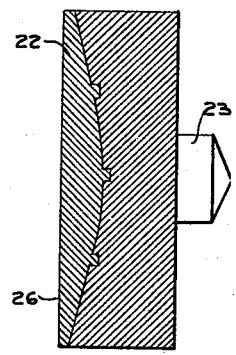
Fig. 2 is a section on the line II—II of Fig. 1.
Figure 3:
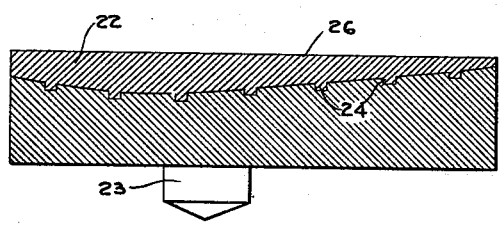
Fig. 3 is a section on the line III—III of Fig. 1.

In Figs. 1, 2 and 3, I show the manner in which I take advantage of the above features in the construction of the segmental bearing shoe 21, which is provided with a lining 22 of any suitable bearing metal, such as Babbitt metal, and with a pivotal mounting button 23. The lining 22 may be secured to the shoe in any suitable manner, but, preferably, it is provided with anchoring projections 24, which fit in recesses provided in the shoe 21.

As shown in the graph in Fig. 4, the pressure across the face of a shoe of this type, as, for example, on the line III—III, reaches a maximum in the region approximately opposite the pivotal mounting button, from whence the pressure decreases, in the manner shown by the graph, to the edges of the shoe. While this graph only shows the pressure along the line III—III, it will be understood that the pressure along any line through that area of the surface, which is substantially opposite the pivotal mounting, would be substantially the same as that shown by the graph in Fig. 4.

I have, therefore, provided a lining of bearing metal, which has a normally flat surface 26, and which has a variable thickness, the point of greatest thickness being in the region opposite the pivotal mounting button 23, from whence the thickness of the lining is progressively decreased directly in proportion to the corresponding drop in pressure, as compared to the pressure which prevails opposite the pivotal mounting button. In other words, the thickness of the bearing lining is substantially proportional, at any point, to the pressure to be sustained at that point.

In the operation of a bearing shoe, as shown in Figs. 1, 2 and 3, under very low pressures, where no flexing, or bending of the shoe takes place, the surface 26 remains a plane surface and, of course, the proper oil film is produced. However, should flexing of the shoe take place due to relatively greater pressures, the thicker portion of the bearing lining would be slightly compressed, the greatest degree of compression taking place where the pressure is the greatest, that is at the thickest portion of the lining and, consequently, the surface 26 will remain a plane surface, and the proper oil film is thus maintained, even though the shoe is somewhat warped, or distorted.

While a bearing shoe, constructed in accordance with my invention, is especially suited for sustaining relatively high thrust pressures, it also finds useful application in bearings where only the lower pressures are encountered, for, where it has heretofore been necessary to scrape some of the metal away from an area in the central portion of the bearing surface, even in bearings used with relatively low pressures, the use of a bearing constructed according to my invention would eliminate this difficulty.

While I have shown my invention embodied in a thrust shoe it will be obvious that my invention is not so limited, but that it also applies to radial bearings of the type described as well as to thrust bearings.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as specifically set forth in the appended claims.

What I claim is:

1. A pressure sustaining member comprising a bearing shoe, a lining for the shoe, said lining having a normally flat surface and having a thickness at points along a line transverse to the direction of fluid flow thereover which is substantially proportional to the pressure to be sustained.

2. A pressure sustaining member comprising a bearing shoe, a lining for the shoe, said lining having a normally flat surface and having a thickness, at points along a line in the direction of fluid flow thereover, which is substantially proportional to the pressure to be sustained.

3. A pressure-sustaining member comprising a bearing shoe, a lining for the shoe, said lining having a substantially flat surface and having a thickness, at points along lines in the plane of the surface and which intersect in the region adapted to sustain relatively higher pressure, which is substantially proportional to the pressure to be sustained.

4. A pressure-sustaining member comprising a bearing shoe, a lining for the shoe, the thickness of the lining being graduated substantially in proportion to the pressure to be sustained, the loci of points of equal thickness being curves which include the area adapted to sustain relatively higher pressure.

5. A pressure-sustaining member comprising a bearing shoe, a lining for the shoe providing a bearing surface, the lining being of a thickness which varies at different points on the bearing surface in proportion to the pressure to be sustained.

In testimony whereof, I have hereunto subscribed my name this 11th day of October, 1927.

HENRY J. HANZLIK.